(12) United States Patent
Passeri

(10) Patent No.: US 7,770,904 B2
(45) Date of Patent: Aug. 10, 2010

(54) STABILITY SYSTEM FOR AN INDUSTRIAL VEHICLE

(75) Inventor: Gianni Passeri, Virgilio (IT)

(73) Assignee: NMHG Oregon, LLC, Portland, OR (US)

(*) Notice: Subject to any disclaimer, the term of this patent is extended or adjusted under 35 U.S.C. 154(b) by 446 days.

(21) Appl. No.: 11/404,607

(22) Filed: Apr. 13, 2006

(65) Prior Publication Data

US 2006/0231312 A1 Oct. 19, 2006

Related U.S. Application Data

(60) Provisional application No. 60/671,548, filed on Apr. 14, 2005.

(51) Int. Cl.
*B62D 61/12* (2006.01)
(52) U.S. Cl. .................................................. 280/43.12
(58) Field of Classification Search .............. 280/43.12, 280/79.11, 124.162, 124.179
See application file for complete search history.

(56) References Cited

U.S. PATENT DOCUMENTS

| | | | |
|---|---|---|---|
| 1,242,500 A | | 10/1917 | Wilcox |
| 2,339,940 A | * | 1/1944 | Noros .......................... 280/46 |
| 2,443,480 A | * | 6/1948 | Schwitzer et al. ............. 180/23 |
| 2,831,699 A | | 4/1958 | Holmes |
| 3,380,546 A | * | 4/1968 | Rabjohn ........................ 180/15 |
| 4,805,710 A | * | 2/1989 | Jarl et al. .................. 180/24.02 |
| 4,884,936 A | * | 12/1989 | Kawada ....................... 414/498 |
| 5,628,377 A | * | 5/1997 | Le Gloan ..................... 180/21 |
| 6,550,101 B2 | * | 4/2003 | Plate ............................. 16/48 |
| 2004/0055108 A1 | | 3/2004 | Lemeur et al. |

FOREIGN PATENT DOCUMENTS

| | | |
|---|---|---|
| DE | 850854 | 9/1952 |
| DE | 2319835 | 10/1973 |
| DE | P 22 20 119.0 | 10/1973 |
| DE | 2616152 | 10/1976 |
| DE | 19753412 | 6/1999 |
| DE | 198 07 849 A1 | 9/1999 |
| DE | 19912932 | 8/2000 |
| DE | 100 22 400 B4 | 6/2006 |
| EP | 0329504 | 8/1989 |
| EP | 0 480 817 A1 | 4/1992 |
| EP | 0480817 | 4/1992 |

(Continued)

OTHER PUBLICATIONS

BT Prime Movers Brochure; "Intelligent Value in Powered Pallet Trucks"; pp. 1-3; Form No. 0993-25M; United States.

(Continued)

*Primary Examiner*—Paul N Dickson
*Assistant Examiner*—Robert A Coker
(74) *Attorney, Agent, or Firm*—Stolowitz Ford Cowger LLP

(57) ABSTRACT

A materials handling vehicle may include a vehicle frame, a drive wheel, a first caster assembly located on the right side of the drive wheel, and a second caster assembly located on the left side of the drive wheel. A weight distribution assembly connects the first or second caster assembly to the vehicle frame and may include an adjustable preload mechanism to provide a preload force to the first or second caster assembly.

23 Claims, 6 Drawing Sheets

FOREIGN PATENT DOCUMENTS

| | | |
|---|---|---|
| EP | 0 584 704 A1 | 8/1993 |
| EP | 0 670 256 A1 | 9/1995 |
| EP | 0670256 | 9/1995 |
| EP | 0919404 | 6/1999 |
| EP | 1 147 968 A2 | 10/2001 |
| EP | 1147968 | 10/2001 |

OTHER PUBLICATIONS

French-to-English translation of foreign reference EP 0480817.

* cited by examiner

STABILITY SYSTEM FOR AN INDUSTRIAL VEHICLE

This application claims priority from U.S. Provisional Application 60/671,548, filed Apr. 14, 2005, and herein incorporated by reference.

BACKGROUND OF THE INVENTION

The invention relates to a transportation device used primarily in a materials handling vehicle such as an industrial pallet truck.

Industrial pallet trucks typically include a drive or steer wheel located proximately under a vehicle frame of the pallet truck. The drive wheel may include a single tire or dual-tire construct. Two casters/wheels are typically employed which are located adjacent and on opposite sides of the drive wheel. The casters provide additional support of the vehicle frame weight as well as provide additional stability as the pallet truck is being turned or operated on an incline.

The pallet trucks may be powered by an electric motor or may be manually pulled or pushed by an operator. Electrically powered pallet trucks may further include a platform upon which an operator may ride during transport of a load. For an electrically powered pallet truck, the steer wheel may additionally be used as the drive wheel, such that the steer wheel also provides a traction force that drives the pallet truck.

Pallet trucks may operate in a variety of operating conditions and locations including, for example, a warehouse, truck yard, grocery store, sidewalk or even an automobile road. Operating surfaces associated with these different locations also vary significantly. For example, the pallet trucks may be required to traverse over relatively smooth paved surfaces or relatively rough unimproved and uneven surfaces such as dirt or gravel roads. Other operating surfaces may include cobbled roads or grooved or siped pavement.

As the pallet truck is moved by either an electric motor or by manual effort of an operator, the drive wheel and casters rotate in the direction of vehicle travel. As the pallet truck is operated over uneven or unimproved surfaces, the steer wheel and casters tend to move up and down in irregular patterns. As a result of the vertical movement, casters may temporarily lose contact with the ground or lose traction, making it harder to operate the vehicle. For example, if the casters lose contact with the operating surface when steering or turning around a corner, a load may move or the pallet truck may tip.

Casters that are rigidly attached to the pallet truck create an additional problem. The drive wheel may partially lose contact with the operating surface, or slip, when either of the casters travels over uneven terrain and moves vertically up and down. If the loss of pressure with the operating surface is significant enough, a loss of traction or braking ability may be experienced.

The present invention addresses these and other problems associated with the prior art.

SUMMARY OF THE INVENTION

A materials handling vehicle may include a vehicle frame, a drive wheel, a first caster assembly located on the right side of the drive wheel, and a second caster assembly located on the left side of the drive wheel. A weight distribution assembly connects the first or second caster assembly to the vehicle frame and may include an adjustable preload mechanism to provide a preload force to the first or second caster assembly.

The foregoing and other objects, features and advantages of the invention will become more readily apparent from the following detailed description of a preferred embodiment of the invention which proceeds with reference to the accompanying drawings.

DETAILED DESCRIPTION

Figure 1:
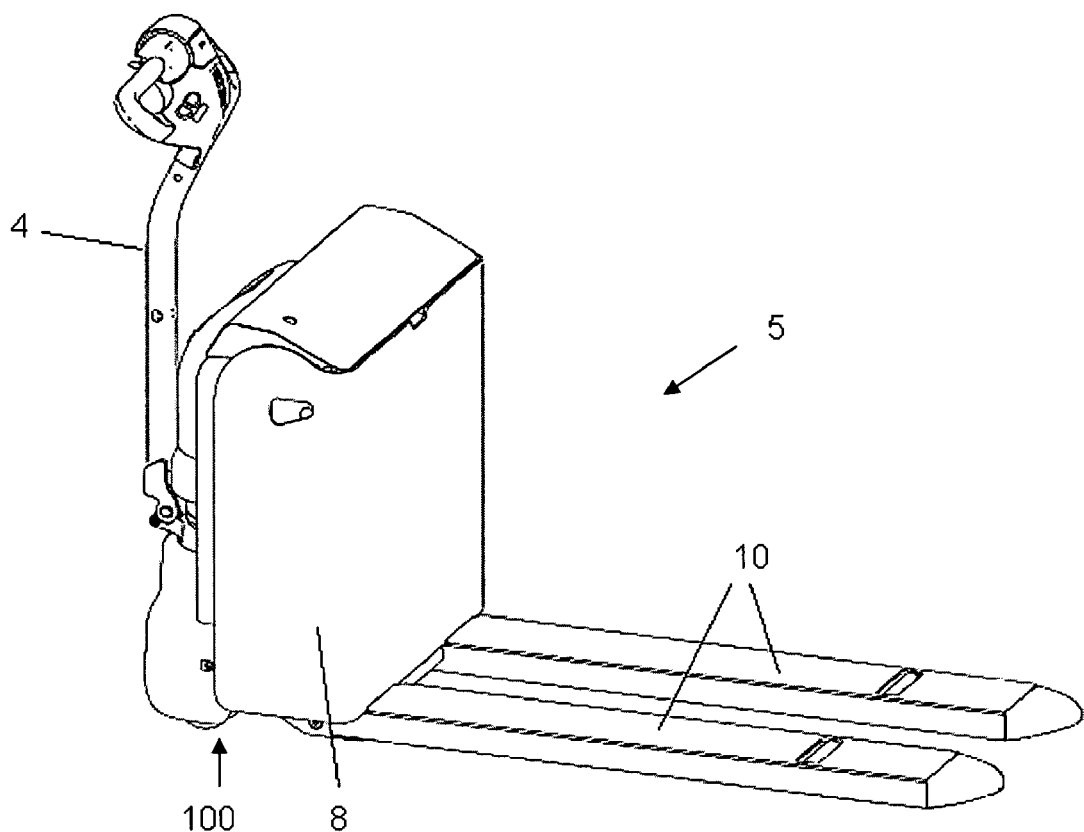
FIG. 1 is a perspective view of a pallet type forklift truck that may include a novel weight distribution assembly.

FIG. 1 shows a pallet type forklift truck 5 that includes forks 10, a vehicle frame 8 and a steer arm 4 by which the forklift truck is guided. The steer arm 4 may include electronic or mechanical controls that raise and lower the forks 10, for example, or that activate a traction motor 7 (FIG. 3) residing in the vehicle frame 8. A weight distribution assembly 100 is located in the back of the forklift truck 5 to improve support and stabilization of the forklift truck 5 during operation.

It should be understood that the forklift truck 5 shown is merely one example of a type of forklift truck that could be used with the weight distribution assembly 100. For example, a motorized rider pallet truck may include an extended frame upon which an operator may stand while the motorized rider pallet truck is being operated. Other industrial lift trucks can similarly use the weight distribution assembly 100, and their applications and embodiments used with the stability system are herein claimed.

Forklift trucks, such as forklift truck 5, may be pulled and guided by an operator by means of the steer arm 4, or they may be powered by the traction motor 7 (FIG. 3) and guided by the steer arm 4. In either case, the forklift truck 5 efficiently transports or moves a load which may be placed on one or more forks such as forks 10.

Pallet trucks may frequently be required to operate over rough pavement or other traveling surfaces. For example, it is common to have traveling surfaces that include stones or are cobbled. The load wheels on previous pallet trucks would tend to bounce up and down while traversing over uneven terrain. This subjected the pallet truck, as well as any load on the forks, to increased vibration and irregular shifts in direction. The weight distribution assembly 100 reduces these previous problems.

Figure 2:
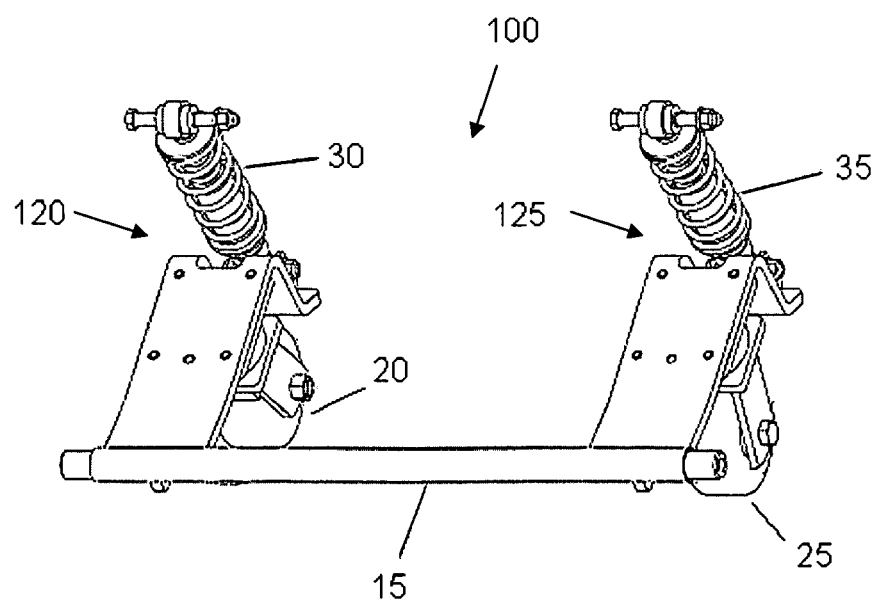
FIG. 2 is a perspective view of the weight distribution assembly that may be used with the forklift truck of FIG. 1.

Referring to FIG. 2, the weight distribution assembly 100 includes a first caster assembly 120 and a second caster assembly 125. The caster assembly 120 and 125 include casters 20 and 25, respectively, as well as dampening devices 30 and 35. The first and second caster assembly 120 and 125, respectively are coupled together with a coupling bar 15.

Figure 3:
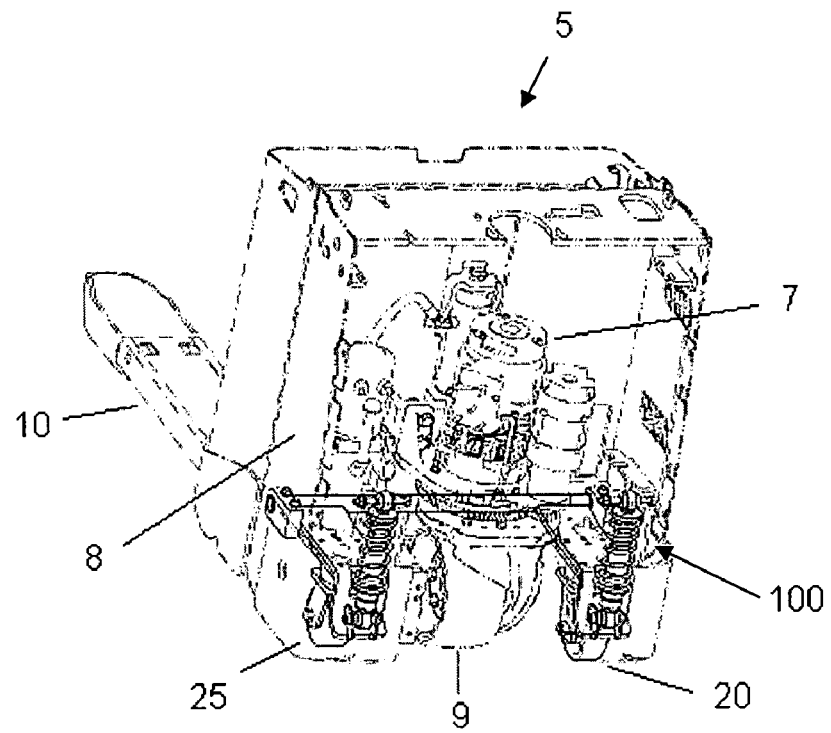
FIG. 3 is a perspective rear view of the forklift truck including the weight distribution assembly of FIG. 2 attached to a vehicle frame.

FIG. 3 shows a rear view of the forklift truck 5 with the steer arm 4 and a back cover removed to show internal components such as the electric motor 7. A drive wheel 9 is located directly below the electric motor 7, along an approximate centerline of the truck in a fore and aft direction. The weight distribution assembly 100 is shown mounted to the vehicle frame 8 such that caster assembly 120 and caster assembly 125 are located on opposite sides of the drive wheel 9.

In a preferred operation of the forklift truck 5, the drive wheel 9 and the casters 20 and 25 all maintain contact with the ground as much as possible. This three point contact helps distribute the supported weight of the forklift truck 5 and load that may be carried on forks 10. Additionally, the casters 20 and 25 provide additional lateral stability when the forklift truck 5 is being turned or when a change in a vehicle center of gravity may otherwise cause the forklift truck 5 to lean or fall over if the casters 20 and 25 were not present.

Figure 4:
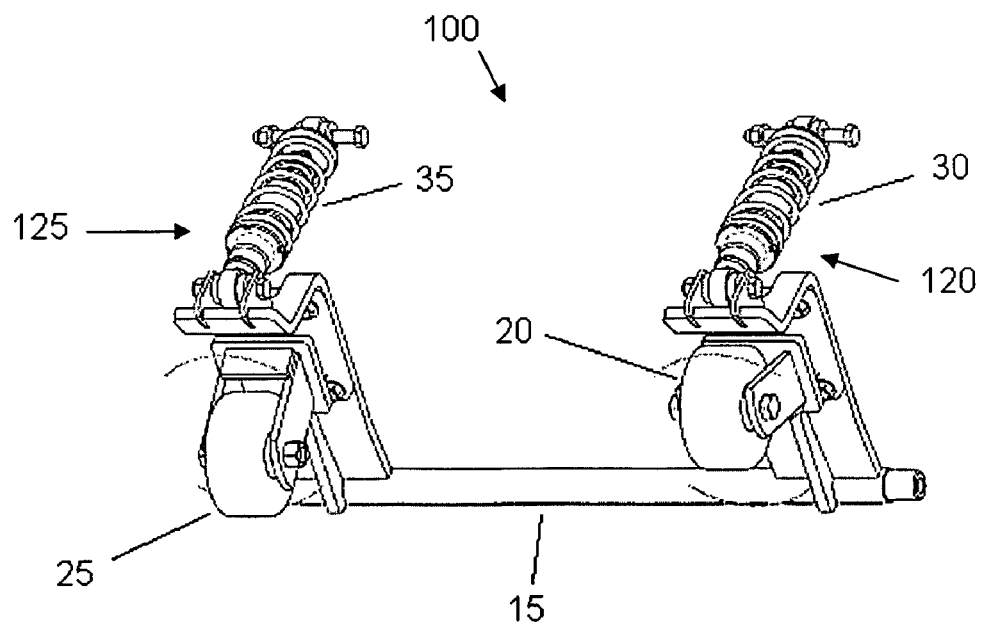
FIG. 4 is a rotated bottom view of the weight distribution assembly shown in FIG. 2.

FIG. 4 shows a rotated bottom isolated view of the weight distribution assembly 100. The weight distribution assembly 100 allows the drive wheel 9 (FIG. 3) to pivot at a constant, fixed height, while the casters 20 and 25 are supported by the dampening devices 30 and 35 and the coupling bar 15.

The casters 20 and 25 are preferably allowed to swivel about an axis perpendicular to the traveling surface. This allows the casters 20 and 25 to follow the direction of the drive wheel 9 as the drive wheel 9 is turned during operation of the forklift truck 5. Swiveling casters are well known in the art and is therefore not described in any further detail. The coupling bar 15 further supports the synchronization of the caster orientation with that of the drive wheel 9.

Figure 5:
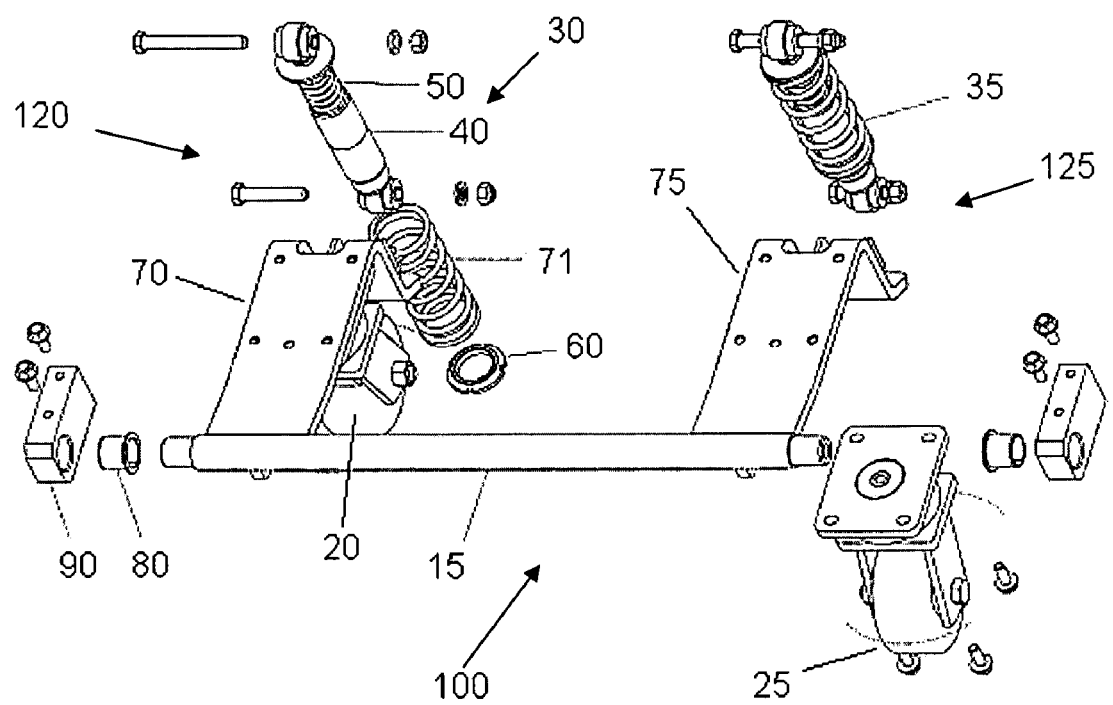
FIG. 5 is an exploded view of the weight distribution assembly.

FIG. 5 shows an exploded view of the weight distribution assembly 100. The caster assembly 125 has three subcomponents that include the dampening device 35, the caster 25 and a mounting plate 75. The mounting plate 75 attaches the dampening device 35 and the caster 25 with coupling bar 15. Similarly, the caster assembly 120 has three subcomponents that include the dampening device 30, the caster 20 and a mounting plate 70. The mounting plate 70 attaches the dampening device 30 and the caster 20 with coupling bar 15.

The dampening device 30 includes a hydraulic shock absorber 40 that works in compression and an internal helical spring 50. The dampening device 30 may further include an external helical spring 71 that slides over the shock absorber 40. The external spring 71 works in compression and may be retained in position with a threaded nut 60, such as a gland nut. The dampening device 35 includes similar components and operates in a similar manner.

Advantageously, the threaded nut 60 may be screwed upward to tighten the compression of spring 71 or screwed downward to loosen the compression of spring 71. Increasing the compression of compression spring 71 by screwing nut 60 upwards increases the amount of preload downward force applied to the caster 20. Decreasing the compression of compression spring 71 by screwing nut 60 downwards decreases the amount of downward preload force applied to the caster 20. Thus, the threaded nut 60 can be selectively adjusted prior to operation to vary the preload force according to individual forklift truck capacity and application requirements.

Other Features

In one embodiment, the weight distribution assembly 100 is assembled as a complete modular unit that may be attached to the vehicle frame 8 as a pre-assembled unit. For example, the weight distribution assembly 100 may be attached to the vehicle frame 8 by means of attaching blocks 90 and flanged bushings 80 shown in FIG. 5. The dampening devices 30 and 35 further attach the mounting plates 70 and 75, respectively, to the vehicle frame 8.

The flanged bushings 80 allow the ends of the coupling bar 15 to be inserted into the attaching blocks 90, such that the coupling bar 15 is free to rotate about its longitudinal axis when either of the dampening devices 30 and 35 compresses and decompresses.

In another embodiment, the coupling bar 15 is made from a unitary non-hollow piece of solid metal. The weight distribution system 100 allows a relatively simple coupling bar 15 to be used for connecting the two caster assemblies 125 and 175 together.

Operation

Figure 6:
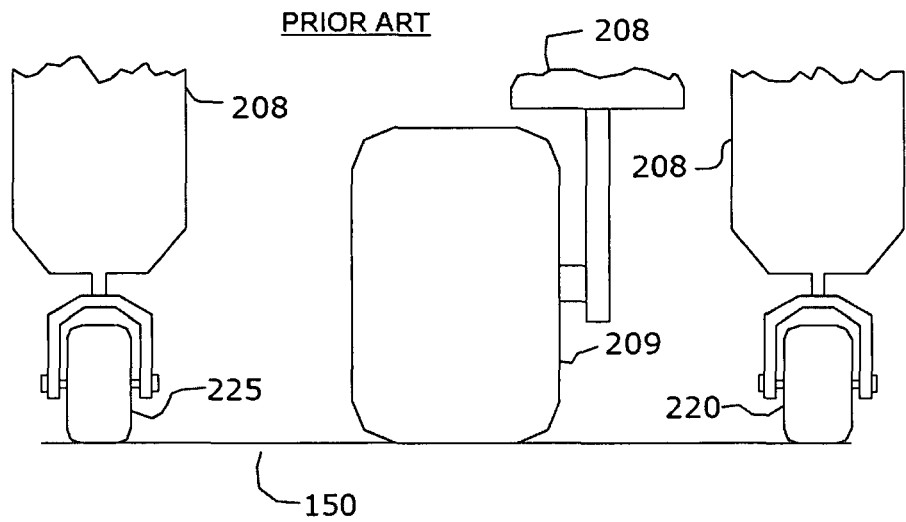
FIG. 6 illustrates an operation of a three wheel system as is known in the art when traveling over a level surface.
Figure 7:
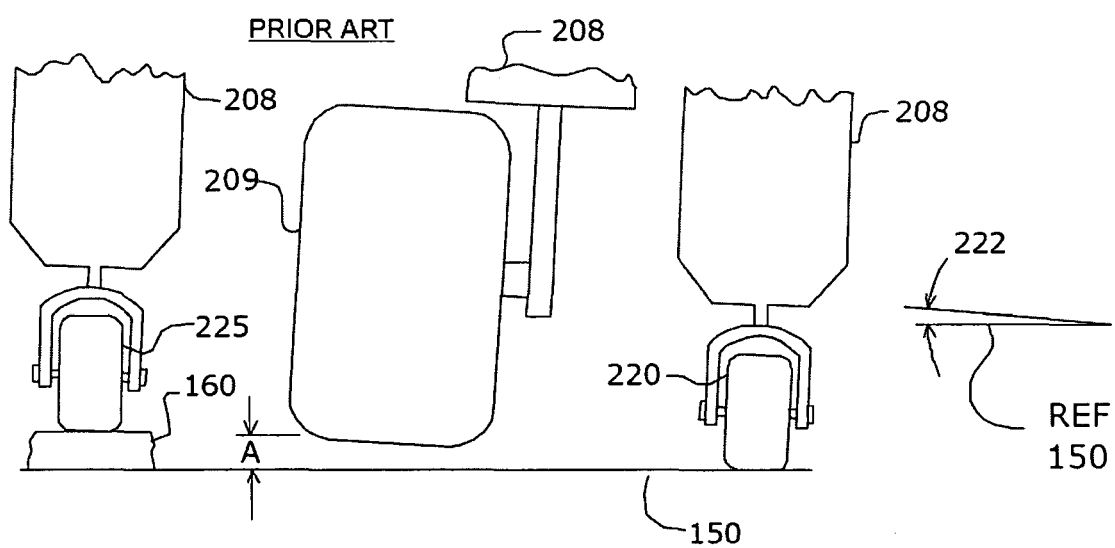
FIG. 7 illustrates an operation of the three wheel system shown in FIG. 6 as is known in the art when traveling over an uneven surface.

An operation of the novel weight distribution assembly is described after first explaining an operation of a three wheel system known in the art, and as illustrated in FIGS. 6 and 7, in order to further clarify some of the improvements. Alternative embodiments of the novel weight distribution assembly are then described and illustrated making reference to FIGS. 8-11.

FIG. 6 illustrates an operation of the three wheel system as is known in the art when traveling over a level surface 150. Casters 220 and 225 are shown attached to a vehicle frame 208 and provide support of a vehicle weight of a pallet truck. Similarly, a drive wheel 209 also attached to the vehicle frame 208, supports the remainder of the vehicle weight of the pallet truck, not supported by casters 220 and 225. The casters 220 and 225 as well as the drive wheel 209 are all shown to be in contact with the level surface 150. Significantly, the casters 220 and 225 as well as the drive wheel 209 may be considered as rigidly attached to the vehicle frame 208, other than an allowed rotation.

FIG. 7 illustrates an operation of the three wheel system shown in FIG. 6 as is known in the art when traveling over an obstacle 160 located on the level surface 150. In this figure, caster 225 is shown at an elevated position above the obstacle 160, while the caster 220 remains on the level surface 150. Significantly, because the casters 220 and 225 and the drive wheel 209 are considered as rigidly attached to a vehicle frame 208 having a tilt angle 222, the drive wheel 209 is caused to lift off the ground by a distance A, thereby losing an ability to provide traction and braking. In addition to creating an inability to accelerate or brake the pallet truck, an instability of the pallet truck also occurs.

Figure 8:
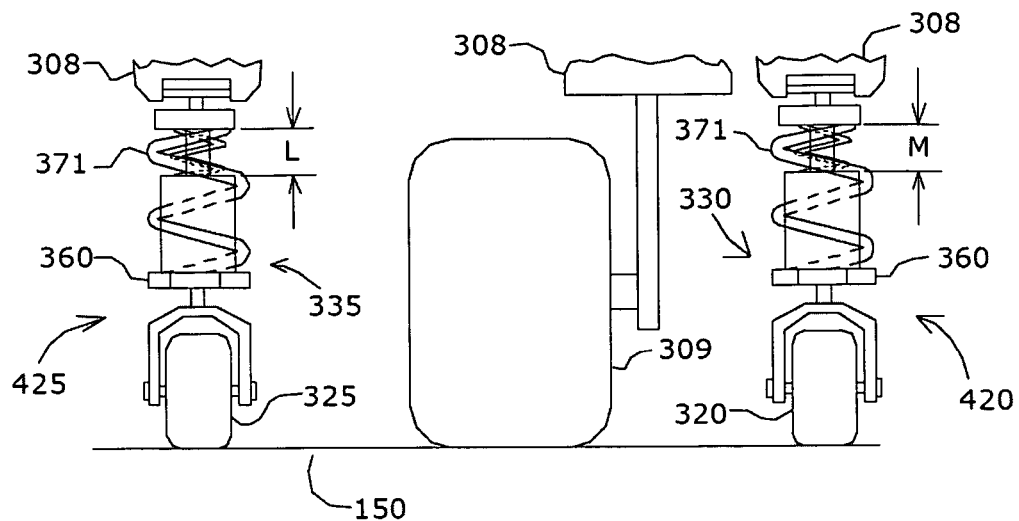
FIG. 8 illustrates an embodiment of the novel weight distribution assembly when traveling over a level surface.

FIG. 8 illustrates an embodiment of the novel weight distribution assembly when traveling over the level surface 150. In this embodiment, casters 320 and 325 are mounted to dampening devices 330 and 335, respectively, of caster assemblies 420 and 425. Dampening devices 330 and 335 are shown as including external springs 371 and nuts 360, in order to provide a variable preload force. The caster assemblies 420 and 425 are mounted on the vehicle frame 308 and provide support of a vehicle weight of a pallet truck. Similarly, a drive wheel 309 supports the remainder of the vehicle weight of the pallet truck, not supported by casters 320 and 325. The casters 320 and 325 as well as the drive wheel 309 are all shown to be in contact with the level surface 150.

The dampening devices 330 and 335 of FIG. 8 are shown to be in a compressed state, with dampening device 330 compressed to a distance M and dampening device 335 compressed to a distance L. In a static condition, the distance M and distance L are the same, provided the dampening devices 330 and 335 have been adjusted similarly.

Figure 9:
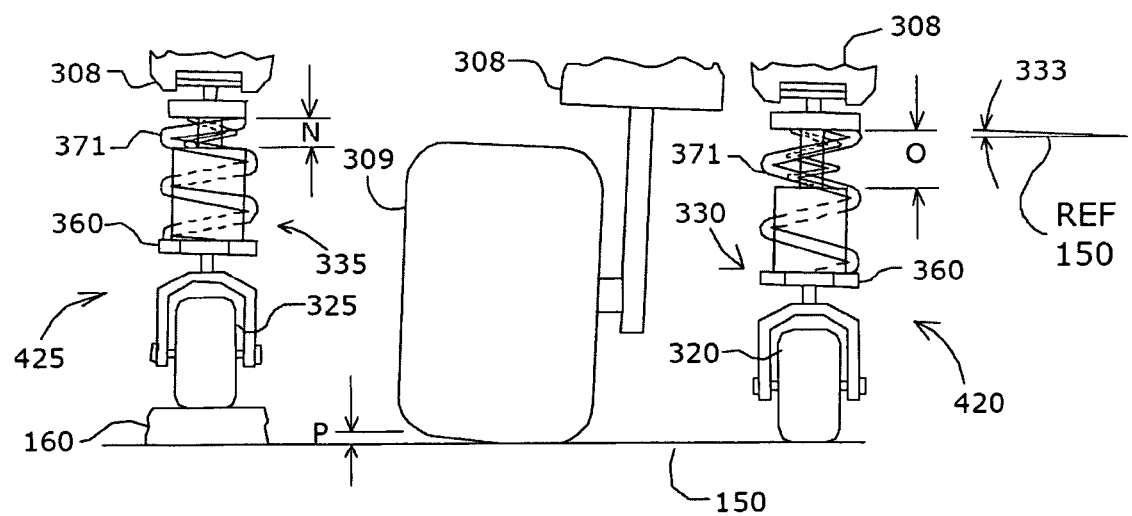
FIG. 9 illustrates an operation of the novel weight distribution system shown in FIG. 8 when traveling over an uneven surface.

FIG. 9 illustrates an operation of the novel weight distribution assembly shown in FIG. 8 when traveling over an obstacle 160 located on the level surface 150. In this figure, caster 325 is shown at an elevated position above the obstacle 160, while the caster 320 remains on the level surface 150. Dampening device 330 is shown compressed to a distance O and dampening device 335 is shown compressed to a distance N. Because of an increased reaction force of the caster 325 and the obstacle 160, the dampening device 335 is compressed more than when the caster 325 is on the level surface 150, as shown in FIG. 8. As a result, distance N in FIG. 9 is substantially less than distance L of FIG. 8. The dampening device 330, on the other hand, may undergo a moderate decrease in reaction force, such that the distance O in FIG. 9 is approximately the same, or slightly greater than distance M of FIG. 8.

Distances N and O may vary with time according to dynamic reaction forces being applied to casters 320 and 325 when traversing over uneven terrain. For example, the distance O may be observed when caster 325 initially comes into contact with obstacle 160. The distance O may thereafter decrease after the reaction forces become static and redistribute the weight of the vehicle frame 308 between casters 320 and 325, in part due to the tilt angle 333.

As a result of the compression of the dampening device 335, the tilt angle 333 of the vehicle frame 308 in FIG. 9 is less than the tilt angle 222 of the vehicle frame 208 in FIG. 7, and the drive wheel 309 is able to maintain contact with the level surface 150. The drive wheel 309 may be partially lifted from the level surface 150, depending on the amount of compression of the dampening devices 330 and 335. The tilt angle 333 may be adjusted by varying the compression of the dampening devices 330 and 335.

One or both of the nuts 360 may be tightened in order to further compress the springs 371 and make more rigid dampening devices 330 and 335. Similarly, one or both of the nuts 360 may be loosened in order to allow the springs 371 to decompress and make less rigid dampening devices 330 and 335. Adjusting the amount of preload of springs 371 may therefore affect a resultant force acting through the casters 320 and 325, varying the degree of the tilt angle 333, and ultimately varying a resultant force acting through the drive wheel 309. An increased resultant force acting through the drive wheel 309 may provide for an increase in vehicle traction and braking ability.

Figure 10:
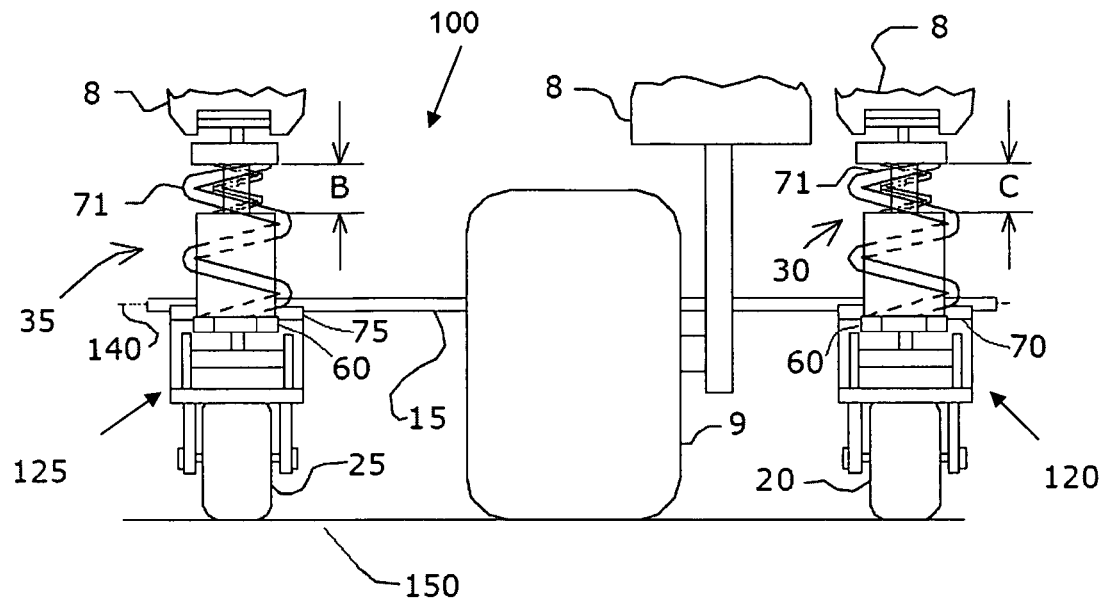
FIG. 10 illustrates a further embodiment of the novel weight distribution assembly when traveling over a level surface.

FIG. 10 illustrates a further embodiment of the novel weight distribution assembly 100 when traveling over a level surface 150. Casters 20 and 25 are shown mounted to mounting plates 70 and 75, which are in turn attached to dampening devices 30 and 35, respectively of caster assemblies 120 and 125. Dampening devices 30 and 35 are shown as including the external springs 71 and the nuts 60, in order to provide variable preload forces. The caster assemblies 120 and 125, are mounted on the vehicle frame 8 and provide support of a vehicle weight of the forklift truck 5. Similarly, a drive wheel 9 supports the remainder of the vehicle weight of the forklift truck 5, not supported by casters 20 and 25. The casters 20 and 25 as well as the drive wheel 9 are all shown to be in contact with the level surface 150.

The dampening devices 30 and 35 of FIG. 10 are shown to be in a compressed state, with dampening device 30 compressed to a distance B and dampening device 35 compressed to a distance C. In a static condition, the distance B and distance C are the same, provided the dampening devices 30 and 35 have been adjusted similarly. In addition caster assemblies 120 and 125 are connected together by the coupling bar 15, having a longitudinal axis 140 about which it may rotate.

Figure 11:
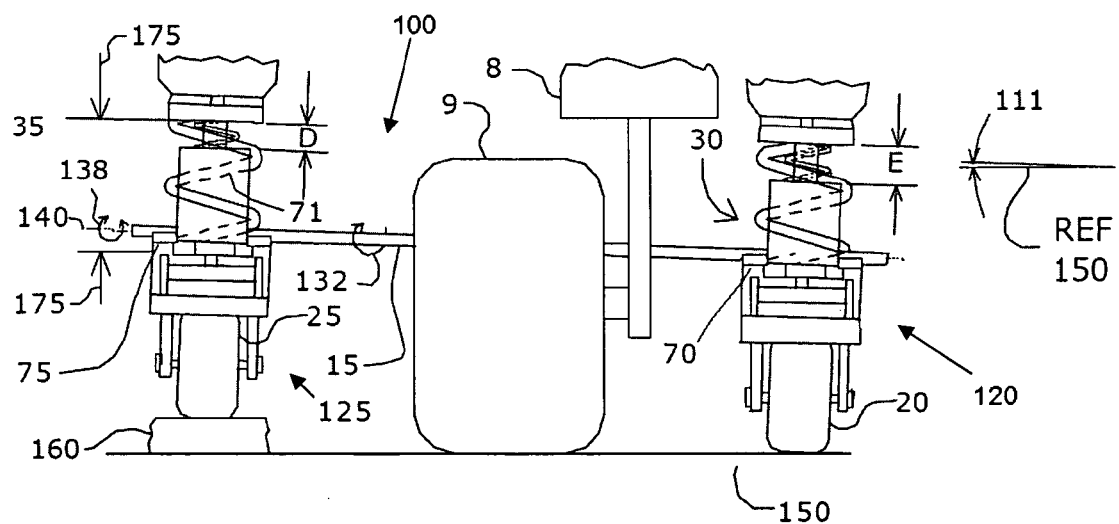
FIG. 11 illustrates an operation of the novel weight distribution system shown in FIG. 10 when traveling over an uneven surface.

FIG. 11 illustrates an operation of the novel weight distribution system 100 shown in FIG. 10 when traveling over an obstacle 160. Caster 25 is shown at an elevated position above the obstacle 160, while the caster 20 remains on the level surface 150.

FIG. 11 shows in more detail how the preloading by the dampening devices 30 and 35 can be selectively varied to control a torsional force or torsional moment about the coupling bar 15. As the forklift truck 5 moves, one or both of the dampening device 30 or 35 may compress. In this example, dampening device 35 experiences compression force 175, for example, when the forklift truck 5 is being turned or maneuvered or when traveling over an obstacle 160. Compression force 175 results in a torsional force 132 being transferred through the coupling bar 15 to the caster assembly 120.

The coupling bar 15 couples the mounting plate 75 to the mounting plate 70. A bending moment of the torsion bar between the first and second caster assembly may be varied according to an amount of compression of the dampening devices 30 and 35. At the same time the coupling bar 15 may rotate 138 about a longitudinal axis 140 of coupling bar 15 according to the amount of compression of the dampening devices 30 and 35.

To adjust a torsional relationship between the two caster assemblies 120 and 125, the preload forces against the two caster wheels 20 and 25 may be adjusted by screwing the nuts 60 up or down. When caster assembly 125 is then further compressed during vehicle travel, the given amount of compression 175 will vary the torsional force 132 transferred through coupling bar 15 to the caster assembly 120.

Dampening device 30 is shown compressed to a distance E and dampening device 35 is shown compressed to a distance D. Because of an increased reaction force of the caster 25 and the obstacle 160, the dampening device 35 is compressed by a greater distance than when the caster 25 is on the level surface 150, as shown in FIG. 10. As a result, distance D in FIG. 11 is substantially less than distance B of FIG. 10.

The torsional force 132 transferred through the coupling bar 15 acts against the mounting plate 70 and results in a further compression of the dampening device 30. As a result of the increased torsional force 132 acting through the coupling bar 15 to the dampening device 132, the compression distance E may be less than distance C of FIG. 10. The distance E in FIG. 10 of dampening device 30 shown in FIG. 11 may be less than the distance O of the dampening device 330 shown in FIG. 9.

Distances D and E may vary with time according to dynamic reaction forces being applied to casters 20 and 25 when traversing over uneven terrain. For example, the distance E may be observed when caster 25 initially comes into contact with obstacle 160. The distance E may thereafter decrease after the reaction forces become static and redistribute the weight of the vehicle frame 8 between casters 20 and 25, in part due to the tilt angle 111.

As a result of the compression of the dampening device 30, the tilt angle 111 of the vehicle frame 8 in FIG. 11 may be equal to or less than the tilt angle 333 of the vehicle frame 308 in FIG. 9, and the drive wheel 9 is able to maintain contact with the level surface 150. The drive wheel 9 may be partially lifted from the level surface 150, depending on the amount of compression of the dampening devices 30 and 35. The tilt angle 111 may also be adjusted by varying the compression of the dampening devices 30 and 35.

The contact between the drive wheel 9 and the level surface 150 may be controlled by varying the amount of preload force in springs 71. Significantly, because of the additional compression of the dampening device 30 as a result of the transferred torsional force through the coupling bar 15, an overall decrease in height of the vehicle frame 8 may be achieved when traversing over the obstacle 160 as compared to vehicle frames 208 and 308 of FIGS. 7 and 9. As a result, a contact pressure between the drive wheel 9 of FIG. 11 and the level surface 150 may be greater than that of drive wheels 209 and 309 of FIGS. 7 and 9, if the tilt angle 111 is equal to the tilt angles 222 and 333, or even if the tilt angle 111 is greater than the tilt angles 222 and 333.

As described above, the preload forces placed on the mounting plates 70 and 75 by compression springs 71 of dampening devices 30 and 35, maintain corresponding contact pressures between the casters 20 and 25 and the ground. This allows the weight distribution assembly 100 to maintain contact of the drive wheel 9 with the ground in different driving and surface conditions while also improving vertical stability of the forklift truck 5.

For forklift trucks having a low lifting capability and that are traveling in a straight line, the described weight distribution assembly 100 provides a relatively static system. The supporting force on each of the caster assemblies 125 and 175 is approximately the same, with the pressure force applied to the drive wheel 9 being load dependent. Furthermore, a load in a central location on the forks 10 contributes to a vertical stabilization of the forklift truck 5.

Forklift trucks having a high lifting capability, however, with increasing lifting height may need a more rigid undercarriage structure. The torsional force 132 exerted on the coupling bar 15 is controlled by the weight distribution assembly 100 so that significant pressure of the drive wheel 9 against the ground surface is maintained even when there are ground irregularities or wear on the drive wheel 9.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A materials handling vehicle comprising:
a vehicle frame;
a drive wheel mounted to the vehicle frame;
a first caster assembly mounted to the vehicle frame, wherein the first caster assembly is located on a right side of the drive wheel, and wherein the first caster assembly comprises a first dampening device;
a second caster assembly mounted to the vehicle frame, wherein the second caster assembly is located on a left side of the drive wheel, and wherein the second caster assembly comprises a second dampening device; and
a torsion rod connecting the first caster assembly to the second caster assembly, wherein the torsion rod is configured to transfer a torsional moment to a caster of the second caster assembly when a caster of the first caster assembly undergoes a vertical displacement in an upward direction towards the vehicle frame, and wherein an amount of compression of the second dampening device varies from that of the first dampening device as a result of the transferred torsional moment.

2. The materials handling vehicle of claim 1, wherein the torsion rod is formed of a unitary continuous piece of non-hollow solid metal.

3. The materials handling vehicle of claim 1, further comprising one or more adjustable preload mechanisms configured to vary an amount of the torsional moment transferred to the second caster assembly.

4. The materials handling vehicle of claim 3, wherein a vertical pressure force exerted on the drive wheel remains substantially constant during the transfer of the torsional moment to the second caster assembly.

5. The materials handling vehicle of claim 1, wherein the torsional moment results from the vertical displacement of the caster of the first caster assembly.

6. The materials handling vehicle of claim 5, wherein the second caster assembly includes a second caster, and wherein the second caster and the drive wheel are configured to remain in contact with a level surface of vehicle travel when the caster of the first caster assembly is vertically displaced.

7. The materials handling vehicle of claim 1, wherein the first and second caster assemblies are rigidly mounted to opposite ends of the torsion rod, and wherein the torsional moment results from a difference in vertical displacement between the casters of the first and second caster assemblies.

8. The materials handling vehicle of claim 7, wherein a vertical force applied against the caster in the first caster assembly causes the vertical displacement of the caster of the first caster assembly to be greater than a vertical displacement of the caster of the second caster assembly.

9. The materials handling vehicle of claim 1, wherein the first dampening device comprises a first spring, wherein the second dampening device comprises a second spring, and wherein an amount of compression of the second spring is less than an amount of compression of the first spring.

10. A weight distribution system comprising:
a first caster assembly including a first damping device and a first caster wheel, wherein the first caster assembly is configured to mount to a right side of a vehicle frame;
a second caster assembly including a second damping device and a second caster wheel, wherein the second caster assembly is configured to mount to a left side of the vehicle frame; and
a torsion bar connecting the first caster assembly to the second caster assembly, wherein the torsion bar is configured to partially transfer a vertical force applied to the first caster wheel to increase an amount of compression of the second damping device, and wherein the amount of compression of the second damping device is less than an amount of compression of the first damping device when the vertical force is applied to the first caster wheel.

11. The system of claim 10, wherein the first caster assembly is rigidly attached to one end of the torsion bar, and wherein the second caster assembly is rigidly attached to an opposite end of the torsion rod.

12. The system of claim 11, further comprising a preload mechanism configured to vary an amount of torsional moment of the torsion bar resulting from the vertical force applied to the first caster wheel.

13. The system of claim 12, wherein the preload mechanism is adjustable according to a maximum load weight.

14. The system of claim 10, wherein the first and second caster assemblies each include:
a shock absorber coupled between the vehicle frame and a mounting plate that couples to the first caster wheel or the second caster wheel; and
a compression spring that extends over the shock absorber between the vehicle frame and the mounting plate that has an adjustable compression mechanism.

15. The system of claim 14, wherein the mounting plate rigidly connects the first caster wheel or the second caster wheel to the torsion bar.

16. The system of claim 10, wherein the vertical force is applied to the first caster wheel that is offset from an axis of rotation of the torsion bar, and wherein a vertical displacement of the first caster wheel results in a torsional moment of the torsion bar that is imparted to the second caster wheel.

17. The system of claim 10, wherein the system is configured to operate with a five-wheel vehicle including a drive wheel, and wherein the first and second caster assemblies are configured to mount to a vehicle frame of the five-wheel vehicle on opposite sides of the drive wheel.

18. The system of claim 10, wherein a vertical distance from the first caster wheel to the vehicle frame varies with the amount of compression of the first damping device, and wherein a vertical distance from the second caster wheel to the vehicle frame varies with the amount of compression of the second damping device.

19. The system of claim 18, wherein the first and second caster wheels are rigidly mounted to opposite ends of the torsion bar, and wherein the vertical distance from the first caster wheel to the vehicle frame is less than the vertical distance from the second caster wheel to the vehicle frame when the vertical force is applied to the first caster wheel.

20. A system comprising:
  means for compressing a first damping assembly attached to a first caster assembly when a caster of the first caster assembly undergoes a vertical displacement;
  means for transferring a torsion force, generated by the first damping assembly being compressed, along a coupling rod positioned between the first caster assembly and a second caster assembly; and
  means for compressing a second damping assembly attached to the second caster assembly as a result of the transferred torsion force, wherein a distance of compression of the second damping assembly is less than a distance of the vertical displacement of the caster of the first caster assembly.

21. The system of claim 20, wherein a distance of compression of the first damping assembly is greater than the distance of compression of the second damping assembly.

22. The system of claim 21, wherein the second damping assembly continuously applies a downward force on a caster of the second caster assembly while the caster of the first caster assembly is vertically displaced.

23. The system of claim 21, wherein the vertical displacement comprises an upward directional vertical displacement of the caster of the first caster assembly.

* * * * *

UNITED STATES PATENT AND TRADEMARK OFFICE
CERTIFICATE OF CORRECTION

PATENT NO. : 7,770,904 B2
APPLICATION NO. : 11/404607
DATED : August 10, 2010
INVENTOR(S) : Gianni Passeri Page 1 of 1

It is certified that error appears in the above-identified patent and that said Letters Patent is hereby corrected as shown below:

Column 10, line 18 (Claim 22):  Delete "claim 21," and insert -- claim 20, --; and Column 10, line 22 (Claim 23):  Delete "claim 21," and insert -- claim 20, --.

Signed and Sealed this
Thirteenth Day of November, 2012

David J. Kappos
*Director of the United States Patent and Trademark Office*